United States Patent [19]
Rex et al.

[11] Patent Number: 5,589,538
[45] Date of Patent: Dec. 31, 1996

[54] POLYURETHANE LOW PROFILE ADDITIVES FOR POLYESTER-BASED MOLDING COMPOSITIONS

[75] Inventors: Gary C. Rex, Cross Lanes; Kenneth E. Atkins, South Charleston, both of W. Va.

[73] Assignee: Union Carbide Chemicals & Plastics Technology Corporation, Danbury, Conn.

[21] Appl. No.: 358,262

[22] Filed: Dec. 19, 1994

Related U.S. Application Data

[63] Continuation-in-part of Ser. No. 258,658, Jun. 13, 1994, abandoned, which is a continuation of Ser. No. 815,255, Dec. 31, 1991, abandoned.

[51] Int. Cl.$^6$ .............................. C08L 75/04; C08L 67/06
[52] U.S. Cl. .......................... 525/28; 525/440; 525/453; 525/454
[58] Field of Search .......................... 525/28, 440, 453, 525/454

[56] References Cited

U.S. PATENT DOCUMENTS

| | | | |
|---|---|---|---|
| 4,035,439 | 7/1977 | Stevenson | 260/859 R |
| 4,421,894 | 12/1983 | O'Connor et al. | 525/28 |
| 4,758,400 | 7/1988 | Dunnavant et al. | 264/320 |
| 4,876,296 | 10/1989 | Millet et al. | 523/200 |

FOREIGN PATENT DOCUMENTS

| | | |
|---|---|---|
| 0074746 | 3/1983 | European Pat. Off. . |
| 0247429 | 12/1987 | European Pat. Off. . |
| 0254186 | 1/1988 | European Pat. Off. . |
| 47-19696 | 6/1972 | Japan . |
| 52-141891 | 11/1977 | Japan . |

OTHER PUBLICATIONS

Computer based literature search on Polyurethane Polymers as Low Profile Additives, plus two updated.
Atkins, et al., Vertical Body Panels: Class A Surface from Flexible Sheet Molding Compound. 46th Annual Conference, Composites Institute, The Society of the Plastics Industry, Inc., Feb. 18–21, 1991.

*Primary Examiner*—W. Robinson H. Clark
*Attorney, Agent, or Firm*—W. K. Volles

[57] ABSTRACT

Polyurethanes having utility, for example, as low profile additives, in polyester-based molding compositions, a method of preparing polyester-based molding compositions containing such polyurethane low profile additives and thermoset articles made with the method are disclosed. The disclosed polyurethane low profile additives can enhance the pigmentability of molded articles comprising the low profile additives. The low profile additives comprise the reaction product of a hydroxyl-terminated prepolymer and an anhydride such as a dicarboxylic acid anhydride, preferably reacted in the presence of a catalyst comprising an amine having from about 4 to 20 carbon atoms.

9 Claims, No Drawings

POLYURETHANE LOW PROFILE ADDITIVES FOR POLYESTER-BASED MOLDING COMPOSITIONS

This application is a continuation-in-part of application Ser. No. 08/258,658, filed Jun. 13, 1994, which is a continuation of application Ser. No. 07/815,255, filed Dec. 31, 1991, now abandoned.

FIELD OF THE INVENTION

This application relates to reinforced thermosetting polyester compositions, and more particularly, to certain polyurethane low profile additives which can provide both shrinkage control and pigmentability in such compositions.

BACKGROUND OF THE INVENTION

Reinforced thermosetting polyester-based molding compositions in the form of sheet molding compound (SMC) and bulk molding compound (BMC) have been known for many years. These materials are based on unsaturated polyester resins produced from a reaction between a polyol having at least 2 hydroxyl groups, and a mixture of saturated and unsaturated dicarboxylic acids (or their anhydrides). The initially formed unsaturated polyester resin is blended with one or more monomers capable of crosslinking with the unsaturated in the polyester, a peroxide catalyst, and a reinforcing material such as fiberglass, then heated to decompose the peroxide and cause the crosslinking reaction between the monomer and the unsaturation in the polyester molecule to occur. The resulting product is a composite of the reinforcing material and the crosslinked polyester.

Thermoplastic materials are often added to the molding compositions in order to reduce shrinkage of the part during cure, or in some cases a small amount of expansion, thereby providing molded parts which more accurately reflect the molds in which they were made, and which have relatively smooth surfaces. These thermoplastics are referred to in the art as "low profile additives".

A number of thermoplastics have been found to give varying levels of shrinkage control. Examples are poly(vinyl acetates); polymethylmethacrylates and copolymers with other acrylates; copolymers of vinyl chloride and vinyl acetate; styrene-butadiene copolymers and other elastomers; polystyrene and certain copolymers of certain monomers; polycaprolactones; cellulose acetate butyrate; saturated polyesters and various blends of saturated polyesters with poly(vinyl chloride); and polyurethanes.

In molding compositions containing polyurethane low profile additives, the polyurethane is typically prepared by first reacting an organic polyisocyanate with a polyester or polyether polyol to form a hydroxyl-terminated prepolymer and then reacting this with a dicarboxylic acid anhydride to form an esterified polyurethane.

In addition to the thermoplastics, the thermosetting polyester resin compositions often also contain a variety of additives, including pigments. However, the effects of the polyurethane additives on the pigmentability of polyester-based thermosetting resin compositions can result in molded articles which have a hazy, blotchy or agglomerated appearance (referred to in the art as mottling).

Accordingly, improved polyurethane low profile additives are desired which can provide molded articles with improved pigmentability characteristics in addition to shrinkage control.

SUMMARY OF THE INVENTION

By the present invention, improved polyurethane low profile additives are provided which can provide enhanced pigmentability and shrinkage control to polyester-based thermosetting molding compositions. Preferably, the polyurethane low profile additives of the present invention are esterified by reacting a hydroxyl terminated polyurethane prepolymer and an anhydride in the presence of an amine catalyst, such as, for example, triethylene diamine.

Improved processes for enhancing the pigmentability of molded articles using the polyurethane low profile additives of the present invention, and molded articles produced thereby, are also provided by the present invention.

DETAILED DESCRIPTION OF THE INVENTION

The polyisocyanates employed in the polyurethane low profile additives of the invention are any of the polyisocyanates known to the art as appropriate for use in the preparation of polyurethane materials. Examples of such polyisocyanates are materials such as tetramethylene diisocyanate, hexamethylene diisocyanate, 1,4-cyclohexane diisocyanate, 1,3-cyclohexane diisocyanate, xylene diisocyanate, isophorone diisocyanate, 4,4'-diphenylmethane diisocyanate, 2,4-toluene diisocyanate, 2,6-toluene diisocyanate, and straight or branched urethane polymers containing multiple isocyanate substituent groups, these polymers being synthesized from a simple polyisocyanate and at least one polyol having at least two active hydrogen atoms. Examples of the latter materials are isocyanate-containing prepolymers prepared by reaction of a toluene diisocyanate, or a methylenediphenylene diisocyanate or polymeric form thereof, with a polyalkylene oxide diol such as polypropylene oxide diol. Materials having three isocyanate groups may also be employed.

Preferred polyisocyanates are materials such as 2,4-toluene diisocyanate, 2,6-toluene diisocyanate, mixtures thereof, 4,4'-diphenylmethane diisocyanate and isomers thereof, and isophorone diisocyanate.

Polyisocyanates suitable for use in polyurethane manufacture are exemplified and discussed in Frisch, K.C., "Fundamental Chemistry and Catalysis of Polyurethanes," Polyurethane Technology, Paul F. Bruins, Ed., Interscience Publishers, 1969. Further details concerning the selection and amounts of polyisocyanates suitable for use in accordance with the present invention are known to those skilled in the art.

The polyols which may be employed in synthesizing the polyurethane low profile additives of the invention are any of the polyols known to the art as useful for the synthesis of polyurethane materials such as polyether polyols, polyester polyols (including those derived from polylactones), and hydroxyl group-containing vinyl polymers, polyester polyols being preferred. In these materials primary hydroxyl groups are preferred. Mixtures of these materials may also be employed. The average functionality of the polyol or polyol blend is in the range of 2 to 3 hydroxyl groups per molecule. Preferably, polyol blends include some triol. The average molecular weight of the polyol or polyol blend is in the range from about 500 to about 10,000 grams pr gram mole. Preferably, the average molecular weight will be in the range 1000 to 3000 grams per gram mole. As used herein the term average molecular weight refers to number average molecular weight. Techniques for determining the number average molecular weight are known to those skilled int he art.

Examples of polyols which are suitable for preparation of the polyurethane low profile additives of the invention are materials such as: (1) hydroxyl-containing vinyl-based polymers such as copolymers of vinyl acetate or other vinyl esters with hydroxyl containing unsaturated monomers, terpolymers of vinyl chloride and vinyl acetate (or other vinyl esters) with hydroxyl containing unsaturated monomers, and also, hydrolyzed versions of vinyl ester containing polymers; (2) polyester polyols, diols, and triols, such as those based on the condensation products of polycarboxylic acids and polyols, preferably those of dicarboxylic acids or anhydrides (preferably those having three or more carbon atoms) and diols (preferably those having two or more carbon atoms) with or without some triol; these are preferred materials, examples of which are the reaction products (a) of adipic acid and diethylene glycol, (b) of ethylene glycol and butylene glycols mixtures with adipic acid, (c) of ethylene glycol with adipic acid, (d) of butylene glycol with adipic acid, (e) of hexanediol with adipic acid, (f) of neopentyl glycol with adipic acid, (g) of propylene glycol with adipic acid, (h) of mixtures of adipic acid and isophthalic acid with such glycols as diethylene glycol or hexanediol or mixtures of hexanediol and ethylene glycol, (i) of adipic acid with mixtures of diethylene glycol and glycerine; (3) lactone polyols, particularly those obtained from the polymerization of e-caprolactone; (4) modified polyester polyol prepared by reaction of e-caprolactone, diacid, and diol; (5) polyether polyols, diols, and triols, such as polypropylene oxide and ethylene oxide capped PPO (which yields primary hydroxyls); and (6) amine-terminated polyols such as amino terminated polypropylene oxide or polypropylene oxide/polyethylene oxide polyethers. These and other such materials are prepared in the manner well known to the art.

Polyols suitable for synthesis of polyurethanes are discussed and exemplified in Frisch, K. C., "Fundamental Chemistry and Catalysis of Polyurethanes," Polyurethane Technology, Paul F. Bruins, Ed., Interscience Publishers, 1969. Further details concerning the selection and amounts of polyols suitable for use in accordance with the present invention are known to those skilled in the art.

The diol chain extenders which are suitable for preparing the polyurethane low profile additives of the invention are different from the polyols discussed above. They have molecular weights generally in the range of 62 to 500 grams per grain mole, and generally contain between 2 and 32 carbon atoms.

Examples of low molecular weight diol chain extenders which may be employed in synthesizing the polyurethane low profile additives of the invention are neopentyl glycol, 1,4-butanediol and other butanediol isomers, 1,6-hexanediol and other hexanediol isomers, ethylene glycol, 1,3-propylene glycol and 1,2-propylene glycol, isomers of cyclohexane dimethanol, 1,6-octanediol and other octanediol isomers, diethylene glycol, and dipropylene glycol. Preferred materials are the aliphatic, linear, primary diols. These materials are either commercially available or may be readily prepared by methods well known to those skilled in the art.

The hydroxyl-terminated polyurethane low profile additives of the invention are synthesized by reacting the polyisocyanate, the polyol or blend of polyols, and preferably, the diol chain extender in the presence of a catalyst, e.g., dibutyltindilaurate or dibutyl di(lauryl mercapto), in a manner known to the art. Preferably, the hydroxyl-terminated polyurethane prepolymers of the present invention are prepared by first introducing the desired amounts of the polyol and the diol chain extender, if used, into the desired amount of an ethylenically unsaturated compound, i.e., a reactive copolymerizable solvent. Then the desired amount of the polyisocyanate is added to the mixture. Then the desired amount of the catalyst is added to provide the hydroxyl terminated prepolymer.

In the reaction, the polyol and diol chain extender, considered together, are employed in a slight molar excess relative to the polyisocyanate. The diol chain extender typically constitutes between 20 and 80 percent of the sum of the polyol and diol chain extender on a molar basis. Preferably, the diol chain extender constitutes 40 to 60 percent of the sum of polyol and diol chain extender on a molar basis. Considered from another vantage point, residues of the diol chain extender will generally constitute between 1 and 25 percent by weight, preferably 4 to 7 percent by weight, of the product polyurethane.

Preferably the hydroxyl-terminated polyurethane low profile additive will comprise the reaction product of (a) from about 5 to 15 wt. % of the polyisocyanate;

(b) from about 80 to 90 wt. % of the polyol; and (c) from about 1 to 6 wt. % of the diol chain extender, based on the total weight of the polyisocyanate, the polyol and the diol chain extender.

The preparation of polyurethanes is discussed in Frisch, K. C., "Fundamental Chemistry and Catalysis of Polyurethanes," Polyurethane Technology, Paul F. Bruins, Ed., Interscience Publishers, 1969. Further details concerning the preparation of hydroxyl-terminated polyurethanes suitable for use in accordance with the present invention are known to those skilled in the art.

It is desirable in accordance with the present invention to have carboxyl functionalities on the low profile additives to allow them to enter the chemical thickening reaction of certain BMC and SMC formulations. This can be achieved by reacting all or a portion of the excess hydroxyl groups referred to above with an anhydride, preferably, a dicarboxylic acid anhydride to form an ester and a carboxyl moiety. Carboxyl groups can also be introduced into the polyurethane polymers by the use of carboxy containing diols such as dimethylol propionic acid and the like as a portion of the polyol/diol materials in the reaction with polyisocyanate.

To form a prefered esterified polyurethane according to the invention, the hydroxyl-terminated prepolymer, as defined above, is then reacted with an anhydride. The reaction is carried out using methods well known in the art and employing such relative proportions of the reactants so as to achieve an oligomer product having a final free OH content preferably of from about 0 to about 5 percent, and most preferably from about 0 to about 5 percent, and most preferably from about 0 to about 1 percent. Amy suitable anhydride which is derived from an aliphatic or aromatic dicarboxylic acid is preferred. The anhydride which is employed may be unsubstituted or it may be substituted with any of a variety of substituents, e.g., alkyl, halo, haloalkyl, cycloaliphatic, aryl, etc. Illustrative dicarboxylic acid anhydrides include: aliphatic dicarboxylic acid anhydrides such as maleic anhydride, succinic anhydride, glutaric anhydride, citraconic anhydride, 2,3-dimethyhnaleic anhydride, camphoric anhydride, cis-1,2-cyclohexane dicarboxylic anhydride, and the like; and aromatic dicarboxylic acid anhydrides such as phthalic anhydride, homophthalic anhydride, trimellitic anhydride, and the like. Preferred dicarboxylic acid anhydrides for use in the practice of the invention include unsubstituted and substituted maleic anhydrides, succinic anhydrides and glutaric anhydrides. Unsubstituted maleic anhydride, succinic anhydride and glutaric anhydride are the most preferred. By reaction of the hydroxyl-containing prepolymer with the dicarboxylic acid anhydride, a controlled molecular weight polyurethane oligomer with terminal carboxylic acid groups can be produced.

Preferably, the reaction is carried out in the presence of an ethylenically unsaturated compound, i.e., a reactive copolymerizable solvent. Suitable copolymerizable solvents are generally those which are a liquid at room temperature and pressure, e.g., from about 4 to 18 carbon atoms, and include, for example, vinylidene compounds such as styrene, vinyl toluene, methacrylic esters, acrylic esters, divinyl benzene, and the like, familiar to those skilled in the art. The amount of copolymerizable solvent employed may be varied over a wide range. Generally, however, the copolymerizable solvent is employed in an amount of from about 0 to about 90 parts, and preferably from about 40 to about 70 parts, by weight per 100 parts by weight of the esterified polyurethane plus copolymerizable solvent.

Preferably, the reaction of the hydroxyl-terminated prepolymer and the anhydride is carried out in the presence of a catalyst comprising an amine having from about 4 to 20 carbon atoms per molecule. Preferably, the amine is a diamine. Even more preferably, the amine has a cyclic structure. Often, the amine will be a secondary amine, and preferably, a tertiary amine. The molecular weight of the amine will typically range from about 50 to 150 grams per gram mole. Preferably the amine will have no, or substantially no, active hydrogens.

The preferred catalyst for esterifying the hydroxyl-terminated prepolymers of the present invention is triethylene diamine, however other amines could be used such as, for example, tripropylamine, imidazole, and the like.

Typically, the catalyst will be present in an amount of from about 100 to 1000 ppmw based on the total weight of the ethylenically unsaturated compound, the anhydride, the hydroxyl terminated prepolymer and the catalyst, and from about 150 to 2500 ppmw based on the total weight of the anhydride, the hydroxyl terminated prepolymer and the catalyst.

Accordingly, the esterified polyurethane polymers of the present invention will typically be present in a composition comprising:

(a) an ethylenically unsaturated compound having from about 4 to 18 carbon atoms per molecule; and (b) an esterified polyurethane compound comprising the reaction product of
(1) a hydroxyl terminated polyurethane prepolymer; and
(2) an anhydride; and (c) an amine having from about 4 to 20 carbon atoms per molecule based on the total weight of the ethylenically unsaturated compound, the esterified polyurethane compound and the amine.

The hydroxyl terminated polyurethane prepolymer preferably comprises the reaction product of:

(i) a polyisocyanate;

(ii) a polyol or polyol blend having an average functionality of 2 to 3 hydroxyl groups per molecule and an average molecular weight of at least 500; and (iii) a diol chain extender having a molecular weight of less than about 500.

Further details concerning the preparation of the esterified polyurethanes of the present invention, e.g., reaction conditions, equipment, amounts of reactants, product recovery, etc., are known to those skilled in the art.

In the molding compositions of the invention, the unsaturated polyester is any of those known to the art. Each is the reaction product of a polyol and at least one olefinically unsaturated dicarboxylic acid or anhydride, and may also include residues of saturated and/or aromatic dicarboxylic acids or anhydrides. The olefinic unsaturation is preferably in the β position relative to at least one of the carbonyl groups of the dicarboxylic acid or anhydride. The unsaturated polyester typically has a molecular weight, in the range of 1,000 to 2,000, and contains residual carboxyl and hydroxyl groups as well as olefinic unsaturation.

Examples of suitable unsaturated dicarboxcyclic acids and anhydrides useful in preparation of the polyesters are materials such as maleic acid or anhydride, fumaric acid, tetrahydro- phthalic acid or anhydride, hexachloroendomethylene tetrahydrophthalic anhydride ("chlorendic anhydride"), itaconic acid, citraconic acid, mesaconic acid, and Diels Alder adducts of maleic acid or anhydride with compounds having conjugated olefinic unsaturation, such adducts being exemplified by bicyclo[2.2.1]hept-5-en3-2,3-dicarboxylic anhydride, methyl maleic acid, and in itaconic acid. Maleic acid or anhydride and fumaric acid are the most widely used commercially.

Examples of saturated or aromatic dicarboxycyclic acids or anhydrides which may be used in the preparation of the polyesters are materials such as phthalic acid or anhydride, isophthalic acid, terephthalic acid, tetrahydrophthalic anhydride, hexahydrophthalic acid or anhydride, adipic acid, isophthalic acid, sebacic acid, succinic acid, and dimerized fatty acids.

Polyols useful in the preparation of the polyesters are materials such as ethylene glycol, diethylene glycol, triethylene glycol, propylene glycol, dipropylene glycol, tripropylene glycol, butylene glycols, neopentyl glycol, 1,3- and 1,4-butane diols, 1,5-pentane diol, 1,6-hexanediol, glycerol, 1,1,1- trimethylolpropane, bisphenol A, and hydrogenated bisphenol A. It is also possible to employ the corresponding oxides, such as ethylene oxide and propylene oxide, etc. Generally no more than about 20% of the polyols employed in the preparation of a polyester are triols.

In addition to the above esters, one may also use dicyclopentadiene-modified unsaturated polyester resins described in U.S. Pat. Nos. 3,986,922 and 3,883,612.

Another type of unsaturated polyester useful for preparation of polyester-based molding compositions is the group of materials known as vinyl esters. These are reaction products of saturated polyesters possessing secondary hydroxyl functionalities with vinyl group-containing acids or anhydrides such as acrylic acid or methacrylic acid. An example is the reaction product of an epoxy resin based on bis-phenol A with an unsaturated carboxylic acid such as methacrylic acid. Vinyl esters and their preparation are disclosed in U.S. Pat. No. 3,887,515.

The unsaturated polyester is generally employed in the molding composition at a level of between 20 and 50%, preferably 30% to 45%, by weight based on the weight of polyester, monomer, and low profile additive employed. In practice, it is usually employed as a 60–65% by weight solution in the olefinically-unsaturated monomer used for crosslinking.

Unsaturated polyester materials are exemplified and discussed in the following references: B. Parkyn, F. Lamb, and B. V. Clifton, "Polyesters", Vol, II, London Iliffe Books, LTD, 1967; J. Bjorksten, H. Tovey, "Polyesters and Their Applications", Reinhold Publishing Corp., 1960. Further details concerning the selection and amounts of unsaturated polyesters suitable for use in accordance with the present invention are known to those skilled in the art.

The olefinically unsaturated monomer employed in the molding composition of the invention is a material which is copolymerizable with the unsaturated ester to cause crosslinking which effects the curing of the polyester. The monomer also serves the function of dissolving the polyester, thereby facilitating its interaction with the other components of the composition. Sufficient monomer is employed to provide convenient processing, but a large excess beyond that required is to be avoided because too much monomer may have an adverse effect on properties of the final composite material.

The monomer is generally employed in the composition at a level of between 30 and 70%, preferably 40 to 55%, by weight based on the weight of polyester, monomer, and any low profile additive employed.

By far the most commonly employed olefinically unsaturated monomer is styrene, although other monomers such as vinyl toluene isomers, methyl methacrylate, acrylonitrile, and substituted styrenes like chlorostyrene and alpha-methyl styrene may also be employed. Others used alone or as mixtures with those monomers previously mentioned are multifunctional monomers such as divinylbenzene and di- and multi-functional acrylates and methacrylates.

In the molding compositions of the invention, the polyurethane low profile additive is a material as defined above and is employed at a level between 5 and 25 percent by weight, preferably 10 to 20 percent by weight, based on the total weight of the unsaturated polyester resin, monomer, and catalyst. The amine catalyst will typically comprise from about 25 to 500 ppmw based on the total weight of the unsaturated polyester resin, monomer, low profile additive and catalyst.

The molding compositions of the present invention typically comprise ether ingredients known by those skilled in the art such as, for example, fiber reinforcements and cheimcal thickeners.

The fiber reinforcenents employed in the molding compositions of the invention are any of those known to the art for use in polyester-based molding compositions. Examples of such materials are glass fibers or fabrics, carbon fibers and fabrics, asbestos fibers or fabrics, various organic fibers and fabrics such as those made of polypropylene, acrylonitrile/vinyl chloride copolymer, and others known to the art. These reinforcing materials are typically employed in the molding compositions at a level of between 5 and 50 percent by weight, based on the total weight of the composition, and preferably 10 to 35 percent by weight.

The chemical thickeners employed in the molding compositions of the invention are any of those known to the art for use in polyester-based molding compositions. These materials include the oxides and hydroxides of the metals of Groups I, II, and III of the Periodic Table. Specific illustrative examples of thickening agents include magnesium oxide, calcium oxide, zinc oxide, barium oxide, calcium hydroxide, magnesium hydroxide, and mixtures thereof. The thickening agents are normally employed in proportions of from about 0.1 to about 6 percent by weight, based on the total weight of the polyester resin, monomer, and low profile additive.

In addition to the above-discussed ingredients, the polyester-based molding compositions of the present invention also frequently contain pigment. The amount of pigment may vary widely, depending on the particular molding composition and pigment used. It is typically employed in the range of about 5 to about 30 pph of resin.

The molding compositions of the invention may also contain one or more other conventional additives, which are employed for their known purposes in the usual amounts. The following are illustrative of such additives:

1. Polymerization initiators such as t-butyl hydroperoxide, t-butyl perbenzoate, benzoyl peroxide, t-butyl peroctoate, cumene hydroperoxide, methyl ethyl ketone peroxide, peroxy ketals, and others known to the art, to catalyze the reaction between the olefinically unsaturated monomer and the olefinically unsaturated polyester. The polymerization initiator is employed in a catalytically effective amount, such as from about 0.3 to about 2 to 3 weight percent, based on the total weight of the polyester, monomer, and low profile additive;

2. Fillers such as clay, alumina trihydrate, silica, calcium carbonate, and others known to the art;

3. Mold release agents or lubricants, such as zinc stearate, calcium stearate, and others known to the art; and Further details concerning the preparation of the molding compositions of the present invention, e.g., reaction conditions, equipment, amounts of reactants, product recovery, etc., are known to those skilled in the art.

In the process for preparing thermoset polyester articles, wherein a mixture of a polymerization initiator and the molding composition as described above is prepared, formed into a desired shape, and cured, the polymerization initiator is a material such as t-butyl perbenzoate, benzoyl peroxide, t-butyl peroctoate, diacetyl peroxide, t-butyl hydroperoxide, cumene hydroperoxide, or a peroxy ketal. The initiator is employed at a level typically between 1 and 2 percent by weight of the unsaturated polyester, monomer, and low profile additive.

Preparation Of The Moldings Compositions

The molding compositions of the invention are typically prepared by mixing the components in a suitable apparatus such as a Hobart mixer, or a Cowles blade high shear mixer (except for the fiberglass), at temperatures on the order of about 20° C. to about 50° C. The components may be combined in any convenient order. Generally, it is preferable that the thermosetting resin and the low profile additive are added in liquid form by preparing a solution of these materials in styrene or some other liquid copolymerizerable monomer. All the liquid components are usually mixed together before adding fillers and the thickening agent. The fiberglass is added after the thickening agent. Once formulated and matured (if desirable), the compositions can be molded into thermoset articles of desired shape, particularly thermoset articles such as automobile body parts. The actual molding cycle will depend upon the particular composition being molded as well as upon the nature of the cured product desired. Suitable molding cycles are conducted on the order of about 100° C. to about 185° C. for periods of time ranging from about 0.5 minutes to about 5 minutes. This depends on the particular catalyst employed.

GLOSSARY

As employed in this application, the following terms have the meanings shown below.

BMC stands for bulk molding composition.

CM-2015 is a 35% carbon black pigment dispersion available from Plasticolors, Inc., Ashtabula Ohio.

DABCO is a cyclic diamine available from Air Products, Allentown Pa.

Fomrez UL-1 is dibutyl di(lauryl mercapto) tin, a commercial product of Witco Chemical Corporation, New York, N.Y.

LP-40A is a proprietary carboxylated poly(vinyl acetate) manufactured and sold by Union Carbide Corporation, Danbury, Conn.

LPA refers to low profile additive.

MA refers to maleic anhydride.

MR 13031 is an unsaturated polyester containing some orthophthalic acid moieties, available from Aristech Chemical Corporation, Pittsburgh Pa.

Neulon T+is a proprietary carboxylated poly(vinyl acetate) manufactured and sold by Union Carbide Corporation, Danbury, Conn.

Omyacarb 5 is a calcium carbonate of 5 micron particle size, available from Omya Corporation, Proctor Vt.

P-276 is a fiber glass reinforcement available from Vetrotex International, Chambery, France.

PA stands for phthalic anhydride.

PG-9033 is a proprietary magnesium oxide dispersion in a low molecular weight unsaturated polyester carrier resin, available from Plasticolors Inc., Ashtabula Ohio.

Polyol A is a polyester polyol produced from the reaction of a mixture of 80% diethylene glycol/adipic acid copolymer and 20% e-caprolactone.

Polyol B is a polyester polyol produced by reaction of a mixture of 20% diethylene glycol/adipic acid copolymer and 80% e-caprolactone.

Polyol C is a polyester polyol produced by a reaction of a mixture containing 35% diethylene glycol/adipic acid copolymer and 65% e-caprolactone.

Polyol D is a polyester polyol which is polycaprolactone initiated by diethylene glycol.

PULPA stands for polyurethane low profile additive.

Rucoflex F203 is a polyester triol which is a glycerine-started diethylene glycol/adipic acid polymer, available from the Ruco Chemical Company, Hicksville, N.Y.

Rucoflex S1011-35 is a polyester polyol which is a diethylene glycol/adipic acid polymer, available from the Ruco Chemical Company, Hicksville, N.Y.

SMC stands for sheet molding compound.

SWI stands for surface waviness index as measured by a Diffracto D-sight audit station produced and sold by Diffracto Ltd.

T-12® stands for dibutyltindilaurate, a product of M & T Chemical, Rahway, N.J.

TDI stands for toluene diisocyanate. The usual 80:20 mixture of the 2,4- and 2,6- isomers was employed.

UPE stands for unsaturated polyester.

EXPERIMENTAL

Synthesis of Polyurethane Low Profile Additives (PULPAs)

The desired amounts of styrene, p-benzoquinone, polyol, and low molecular weight diol chain extender were charged into a reaction flask which was then equipped with a heating mantle, stirring means, and means for introducing dry air or nitrogen. The reactants were blanketed with dry air, nitrogen, or mixtures thereof, the temperature was established at 60° C., the desired amount of TDI was added, taking care to prevent its contact with the skin of the operator, and then the reaction was allowed to proceed for 1.5 hours at 60° C., using a condenser if necessary to recondense volatilized material. The requisite amount of T-12 catalyst was then added and the reaction was allowed to continue for an additional 1 hour at 60° C. An aliquot of the mixture was taken and analyzed for free isocyanate and hydroxyl number. If the free isocyanate was greater than 0.1%, an additional 10% of catalyst was added and the reaction was continued for an additional 1 hour at 60° C. When the free isocyanate content was less than 0.1% a stoichiometric amount of capping anhydride, based on the hydroxyl number, was added. In some cases, the esterification was conducted in the presence of an amine catalyst in accordance with the present invention by adding from about 100 to 800 ppmw of DABCO. In other cases, the esterification was conducted without DABCO present. The reaction temperature was maintained at 60° C. for a further two hour period, then an aliquot was taken and the acid number was determined. The acid number was determined in two ways. One was by a standard titration with KOH. The other was by titration with tripropylamine(As described in Siggia, S., Quantitative Organic Analysis via Functional Groups, Fourth Ed., pp 243–6). This second method was preferred because the titration is responsive to carboxylic acid but not anhydride, whereas a titration with KOH cannot distinguish the two functionalities. Heating was then discontinued and the reaction mixture was allowed to stir and cool overnight. The amounts of reagents used are shown in Table I below.

The materials of experiments 12 and 13 were prepared according to the following procedure, using the amounts of reagents shown in Table 1 below. A reaction flask equipped with a stirrer, thermometer and addition funnel was charged with a first polyester polyol (Rucoflex S-1011-35), a second polyester polyol (Rucoflex F-203) and approximately 70% of the styrene. The mixture was heated to 60° C. and the toluene diisocyanate was added, followed by the remainder of the styrene. The reaction was catalyzed by the addition of the catalyst. The resulting mixture was stirred at 75°–80° C. for 2 hours, at which point the maleic anhydride was added. The resulting mixture was stirred for 2 additional hours at 75°–80° C.

TABLE 1

Reagents for Synthesis of Polyurethane Low Profile Additives (PULPAs)[a]

| Sample No. | 1 | 2 | 3 | 4 | 5 | 6 | 7 |
|---|---|---|---|---|---|---|---|
| Styrene | 2472.4 | 4737.9 | 4718.3 | 1169.6 | 1878.5 | 1892.3 | 1895.5 |
| p-benzo-quinone | 0.49 | 0.95 | 0.94 | 0.19 | 0.38 | 0.38 | 0.38 |
| Polyol A | — | 4120.1 | — | — | — | — | — |
| Polyol B | — | — | 4057.1 | — | — | — | — |
| Polyol C | 2130.4 | — | — | 667.5 | 1624.8 | 1796.6 | — |
| Polyol D | — | — | — | — | — | — | 1802.4 |

TABLE 1-continued

Reagents for Synthesis of Polyurethane Low Profile Additives (PULPAs)[a]

| | | | | | | | |
|---|---|---|---|---|---|---|---|
| Rucoflex S1011-35 | — | — | — | — | — | — | — |
| Rucoflex F 203 | — | — | — | — | — | — | — |
| 1,4-butanediol | 81.0 | 146.3 | 156.6 | 25.2 | 62.4 | — | — |
| 1,6-hexanediol | — | — | — | — | — | — | — |
| TDI | 261.0 | 471.5 | 504.6 | 87.0 | 191.4 | 95.7 | 93.1 |
| T-12 | 0.99 | 1.90 | 1.89 | 0.39 | 0.75 | 0.76 | 0.76 |
| Phthalic anhydride | 48.4 | 89.5 | 96.6 | 7.7 | 54.4 | 37.4 | 39.0 |

| Sample No. | 8 | 9 | 10 | 11 | 12[b] | 13[c] | 14 |
|---|---|---|---|---|---|---|---|
| Styrene | 490.2 | 1947.0 | 1938.3 | 1912.4 | 2348 | 2337 | 927.8 |
| p-benzo-quinone | 0.10 | 0.39 | 0.39 | 0.38 | | | 0.19 |
| Polyol A | — | — | — | — | | | — |
| Polyol B | — | — | — | — | | | — |
| Polyol C | — | — | — | 1656.3 | | | — |
| Polyol D | — | 1690.9 | — | — | | | |
| Rucoflex S1011-35 | 375.0 | — | 1686.9 | — | 1436 | 857 | 465.5 |
| Rucoflex F 203 | — | — | — | — | 47.4 | 611.4 | 365.8 |
| 1,4-butanediol | — | 62.9 | 61.8 | 62.9 | | | 16.6 |
| 1,6-hexanediol | 42.2 | — | — | — | | | — |
| TDI | 73.1 | 193.1 | 189.7 | 193.1 | 74.5 | 78.6 | 80.0 |
| T-12 | 0.20 | 0.78 | 0.78 | 0.76 | | | 0.37 |
| Fomrez UL-1 | | | | | 7.8 | 7.8 | |
| Phthalic anhydride | 19.9 | 50.1 | 45.2 | — | | | 19.0 |
| Maleic anhydride | | | | | 7.4 | 11.0 | |

[a] Amounts in g unless otherwise specified
[b] European Patent Application 74746; Example 3
[c] European Patent Application 74746; Example 4

The exemplary polyurethane low profile additives were tested in a typical molding composition, the detailed makeup of which is shown below. Comparative compositions made with vinyl acetate-based low profile additive and the PULPAs of examples 12 and 13 instead of the PULPAs of the invention were prepared according to the formulation shown below with the exception that the PULPA was replaced by 40 pph of vinyl acetate-based low profile additive (as a 37% solution in styrene) and the supplemental 8 pph of styrene shown in the table below was not employed.

Molding Composition Formula[a]

| Material | Amount |
|---|---|
| MR 13031 | 60 |
| PULPA (50% in styrene) | 32 |
| styrene | 8 |
| t-butyl perbenzoate | 1.5 |
| zinc stearate | 4 |
| CM-2015 (35% carbon black pigment) | 10 |
| Omyacarb 5 | 180 |
| PG-9033 | 1.8 |
| Fiberglass P-276, " | 15% by wt of total |

[a] parts per hundred of resin, except as otherwise noted; resin is unsaturated polyester, styrene, and low profile additive.

General Procedure for Preparation of Bulk Molding Compound (BMC) Formulations

All the liquid components were weighed individually into a Hobart mixing pan placed on a balance. The pan was attached to a Model C-100 Hobart mixer located in a hood. The agitator was started at slow speed, then increased to maximum speed to completely mix the liquids over a period of 3–5 minutes. The agitator was then stopped and the internal mold release agent was next added to the liquid. The mixer was restarted and the mold release was mixed with the liquid until it was completely wet out. The filler was next added to the pan contents with the agitator off, then mixed using a medium to high speed until a consistent paste was obtained. The mixer was again stopped, a weighed amount of thickening agent was added, and then this was mixed into the paste using a slow to medium speed over a period of 2–3 minutes. The mixer was stopped again and about 175 grams of the paste were removed from the pan using a large spatula, and transferred to a wide-mouth 4 oz bottle. The bottle was capped, and the paste sample was stored in the capped bottle at room temperature and viscosity was measured periodically using a model HBT 5X Brookfield Synchro-Lectric Viscometer on a Helipath.

After removal of the paste sample, the composition was reweighed and styrene loss was made up, and chopped glass fibers were added slowly to the pan with the mixer running on slow speed. The mixer was then run for about 30 seconds after all the glass was in the paste. This short mixing time gave glass wet-out without degradation of the glass. The pan was then removed from the mixer and separate portions of the BMC mix of about 1200 grams each were removed using a spatula and were transferred to aluminum foil sheets lying on a balance pan. Each portion of the mix was tightly wrapped in the aluminum foil (to prevent loss of styrene via evaporation) and stored at room temperature until the viscosity of the retained paste sample reached an appropriate molding viscosity. The weight of the BMC added to the foil varies with the molding application.

Apparatus and Process for Preparation of Molding Test Panels

Flat panels for surface evaluation were molded on a 200 ton Lawton press containing a matched dye set of 18"×18" chrome plated molds. The female cavity is installed in the bottom and the male portion is at the top. Both molds are hot oil heated and are controlled so that they can be operated at different temperatures. For the present molding, the top and bottom temperatures were 295°–305 ° F. 1200 g samples of molding compound were employed, and the molded part thickness was 0.120". The molding pressure, which can be varied from 0 to 1000 psi, was run at maximum pressure. The panels were laid on a flat surface, weighted to keep them flat, and allowed to cool overnight. The molded panels were measured with a vernier caliper to an accuracy of 0.001 inch from corner to corner in all four directions to determine shrinkage, which is an average of the four readings. These panels were used for surface smoothness determinations.

Shrink Control Measurement

18"×18"×⅛" flat panels were molded in a highly polished chrome plated matched metal die mold in a 200 ton Lawton press, as described above. The exact dimensions of the four sides of this mold were measured accurately at room temperature, as discussed above. The exact lengths of the four sides of the flat molded panels were determined to the same degree of accuracy. These measurements were substituted into the equation below:

$$(b-a)/a = \text{inch/inch shrinkage}$$

where a=the sum of the lengths of the four sides of the mold, and b=the sum of the lengths of the four sides of the molded panels.

The shrink control measurement compares the perimeter of a cold panel to the perimeter of the cold mold. A reported positive number indicates an expansion and vice-versa for a reported negative number as compared to the cold mold. The units mil/inch indicate the amount of expansion (+) or contraction (−) in mils per inch of laminate (or panel perimeter).

Evaluation of Surface Smoothness

Surface quality measurements were performed on a Diffracto D-sight Audit Station-2 manufactured and sold by the Diffracto Co., Ltd. The surface waviness index (SWI) provided by this instrument is the standard deviation of the panel's surface with regard to long term waviness, as compared to the surface of a perfectly flat panel, whose long term waviness is zero. The smaller the SWI number, the smoother the panel.

Evaluation of Pigmentability

The pigmentability of the molding compositions was determined by evaluating the panels qualitatively and quantitatively for haze and mottling, then assigning pigmentation rating numbers. A pigmentation rating number of 1 means there was no pigment mottling present on the panel and the panel has a maximum depth of color. A pigmentation rating of 3 means there was no mottling present on the panel and the color depth was good, but lighter than panels having a rating number of 1. In such cases the pigment concentration can be used to achieve any color depth desired. With mottling and/or excessive hazing, this is difficult or impossible to accomplish by varying pigment concentration. A pigmentation rating of 4 means that though mottling is not a problem, there was a distinct hazing of the panel's pigmentation as compared to panels with a rating of 1 or 3, and therefore the panel is unacceptable. A rating of 5 means that both mottling and hazing are so severe as to be unacceptable. Ratings of 4 to 5 are the current state of the art for low shrinkage formulations.

The experimental molded panels were evaluated for surface quality, shrinkage control, and pigmentability. Results are shown in Table 2 below.

TABLE 2

SURFACE QUALITY, SHRINKAGE CONTROL, AND PIGMENTABILITY OF MOLDED PARTS MADE WITH MOLDING COMPOSITIONS EMPLOYING POLYURETHANE-BASED LOW PROFILE ADDITIVES

| Sample No. | Description of Low Profile Additive | Surface Quality: SWI | Shrinkage Control: mil/in (mm/cm) | Pigmentation: Comment and Rating No.[a] |
|---|---|---|---|---|
| Control A | LP-40A | 301 | −0.319 (−0.00319) | glossy surface, hazy, mottled 4.5 |
| Control B | Neulon T+ | 133 | 0.111 (0.00111) | glossy surface, hazy, mottled 5 |
| Control C | Polystyrene | — | −1.5 (−0.015) | no mottling |
| Control D | Acrylic polymer | — | −0.6 (−0.006) | hazy, mottled |
| 1 | TDI/Polyol C/1,4-butanediol/phthalic anhydride. 9.75/79.75/6.25/4.25 weight % of polymer. | 298 | 0.083 (0.00083) | glossy surface, no mottling 3 |
| 1A | Same as 1, except pilot plant scale preparation. | 482 | 0.069 (0.00069) | no mottling 3 |
| 1B | Sa,e as 1A. except made into SMC. | 145 | 0.175 (0.99175) | no mottling 3 |
| 2 | Same as 1, except polyol consists of 20% caprolactone and 80% diethylene glycol/adipate polyester. | 468 | −0.061 (−0.00061) | no mottling 3 |
| 3 | Same as 1, except polyol consists of 80% caprolactone and 20% | 450 | −0.035 (−0.00035) | no mottling 3 |

TABLE 2-continued

SURFACE QUALITY, SHRINKAGE CONTROL, AND PIGMENTABILITY OF
MOLDED PARTS MADE WITH MOLDING COMPOSITIONS EMPLOYING
POLYURETHANE-BASED LOW PROFILE ADDITIVES

| Sample No. | Description of Low Profile Additive | Surface Quality: SWI | Shrinkage Control: mil/in (mm/cm) | Pigmentation: Comment and Rating No.[a] |
|---|---|---|---|---|
| | diethylene glycol/adipate polyester. | | | |
| 4 | High MW version of 1. (OH/TDI mole ratio = 1.03) | 544 | −0.453 (−0.00453) | no mottling 2.5 |
| 5 | Low MW version of 1. (OH/TDI mole ratio = 1.15) | 411 | 0.041 (0.00041) | no mottling 3.5 |
| 6 | TDI/Polyol C/phthalic anhydride (no low MW diol) | 326 | −0.111 (−0.00111) | mottling; hazy 4.5 |
| 7 | TDI/Polyol D/phthalic anhydride (no low MW diol) | 192 | −0.222 (−0.00222) | mottling, hazy 4.5 |
| Control B' | Neulon T+ | — | 0.000 (0.00000) | mottling, very hazy 5 |
| 8 | TDI/Rucoflex S 1011-35/1,6-hexanediol/PA | 514 | −0.097 (−0.00097) | no mottling 2.5 |
| 9 | TDI/Polyol D/1,4-butanediol/PA | 352 | −0.013 (−0.00013) | no mottling 3.5 |
| 10 | TDI/Rucoflex 1011-35/1,4-butanediol/PA | 482 | −0.263 (−0.00263) | no mottling 2.5 |
| 11 | TDI/Polyol C/1,4-butanediol (no carboxylation of LPA | — | −0.027 (−0.00027) | no mottling 2.5 |
| 12 | TDI/Rucoflex S 1011-35/Rucoflex F 203/MA (European Patent Application 74746, Example 3) | 370 | −0.208 (−0.00208) | no mottling, hazy 4 |
| 13 | TDI/Rucoflex S1011-35/Rucoflex F 203/MA (European Patent Application 74746, Example 4 | 540 | −0.333 (−0.00333) | no mottling, hazy 4 |
| 1A' | TDI/Polyol C/1,4-butanediol/PA 9.75/79.75/6.25/4.25 wt. % of polymer (pilot plant) | 430 | 0.222 (0.00222) | no mottling 3 |
| 1A" | Same as 1A' but molding composition was unthickened | 586 | 0.486 (0.00486) | mottled, very hazy 5 |
| 14 | TDI/Rucoflex S 1011-35/Rucoflex F 203/1,4-butanediol/PA | 530 | −0.400 (−0.00400) | no mottling 2 |

[a] 1 = excellent (no mottling, and maximum color depth)
3 = good (no mottling, and less color depth than 1)
5 = poor (mottling, and much lighter color depth than 1)

The results presented in Table 2 show that none of the state of the art low profile additives (controls A, B, and B') exhibited good pigmentability. The typical problems associated with poor pigmentability such as severe mottling and hazing were present in the molded laminates. When a first generation low profile additive such as 35% polystyrene solution in styrene (Control C) is substituted into the basic BMC formulation at 40 pph for the poly(vinyl acetate) low profile additives, good pigmentation with no mottling is obtained in the molded parts, but the shrinkage control is poor at 1.5 mils/inch. When a second generation low profile additive such as 40 pph of a 33% acrylic polymer solution in styrene (Control D, e.g., Q-701 from Ashland Chemical) is substituted for the PULPA and the extra styrene in the basic BMC formulation, poor pigmentation due to both mottling and hazing was found in the molded panels. Shrinkage control was 0.6–0.7 mil/inch.

By contrast, the chemically thickened polyurethane-based low profile additives (samples 1, 1A, 1A', 1B, 2–5, 8–11, and 14) produced molding compositions which exhibited good to very good pigmentability, with no mottling present and any slight haziness not being apparent but only affecting the color depth. In general, these compositions also exhibited excellent shrinkage control, with shrinkage values ranging from +0.222 to −0.453 mil/in and averaging −0.065 mil/in. Such a combination of shrinkage control and pigmentability is highly unusual and unique. Generally, molding compositions which exhibit good shrinkage control show poor pigmentability, as shown by the compositions containing the state of the art low profile additive Neulon T+(controls B and B').

Samples 2 and 3 show that pigmentation performance and shrinkage control are not affected when the caprolactone level in the polyol is changed.

Samples 4 and 5 indicate that pigmentability varies somewhat as a function of the molecular weight of the PULPA, the higher molecular weight PULPA affording better pigmentability than the lower molecular weight PULPA. However, the acid number of the high mw material was different from that of the lower mw material.

Samples 6, 7, 12, and 13 show that when the chain extender is absent from the PULPA, pigment- ability of the molding composition containing it is poor. This is true regardless which polyol is used in the PULPA. The presence of chain extenders such as low molecular weight diols are necessary in PULPAs which are to be used in pigmentable molding compositions. Sample 8 indicates that it is immaterial which low mw diol chain extender is used in the PULPA.

The type of polyol employed in the synthesis of the PULPA apparently has a small effect on the ability of the PULPA to provide good pigmentability. The PULPAs of samples 8, 9, and 10 were made with different polyols and provided different degrees of pigmentability, although the pigmentability of all the compositions was satisfactory to very good.

The PULPA of sample 11, which possessed no carboxylation on its backbone, afforded very good pigmentability.

A comparison of samples 1A' and 1A" shows that for good pigmentability, the molding compositions should be thickened. The unthickened sample 1A" showed poor pigmentability, while the otherwise similar thickened material showed good pigmentability.

Finally, a comparison of samples 12, 13, and 14 shows that insertion of low mw diol chain extender into PULPAs which had provided only poor pigmentability produced modified PULPAs which afforded very good pigmentability. This demonstrates the importance of the chain extender in PULPAs for pigmented compositions and shows that the prior art does not contemplate the advantages of this invention.

It has been found that PULPAs of the preferable structure, for example sample 1 of Table 1, compounded and then molded within 5–8 days after synthesis do not give good pigmentation, but give molded laminates that are hazed and/or mottled. This is demonstrated by samples 1 and 2 of Table 3. Note though as the PULPA ages the pigmentation becomes less and less mottled until an acceptable level is reached as shown by sample no. 3. Without being bound to any particular theory, it is believed that the free anhydride slowly reacts with the PULPA's hydroxyl end groups over a period days which gives a PULPA of acceptable pigmentation performance. Therefore the presence of free unreacted anhydride in the newly synthesized PULPA is believed to be the cause of the poor pigmentation performance. This is confirmed by sample 4 of Table 3 where free anhydride was added to the molding composition containing a PULPA that otherwise gives acceptable pigmentation. For sample 4 the pigmentation was hazed and mottled. Quite surprisingly, however, the problem of slow anhydride esterification can be overcome if a catalyst is present during the carboxylation step in accordance with the present invention. The PULPA of Table 1, sample no. 1 was synthesized with 500 ppmw of triethylene diamine (Dabco) present during the esterification step, phthalic anhydride reacting with the hydroxyl endgroups of the PULPA. This PULPA, sample 5 of Table 3, was then compounded immediately after synthesis and, after the customary maturation period of 2–3 days, it was molded. The pigmentation was found to be acceptable, that is essentially free from hazing and mottling.

TABLE 3

Effect of Free Anhydride on Pigmentation Performance

| Sample # | Time from Synthesis to Compounding (Days) | Comment | Pigmentation: Comment and Rating No. |
|---|---|---|---|
| 1 | 5 | Synthesized as per PULPA Table 1, sample no. 1 | mottled & hazed 4.5 |
| 2 | 8 | Same as above | hazed 3.5 |
| 3 | 11 | Same as above | no mottling 3 |
| 4 | >15 | Phthalic anhydride added to molding compound | mottled & hazed 4.5 |
| 5 | 2 | 500 ppmw Dabco added esterification step | no mottling 2.5 |

It has also been found that unusual and unexpected improvements in molded composite flexibility can be obtained when certain of these polyurethane polymers are employed in thermosetting formulas as all or a portion of the low profile additive.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A method of preparing thermoset polyester composition comprising:

(1) preparing a mixture comprising the below-listed ingredients:

(a) an unsaturated polyester;
(b) an ethylenically unsaturated monomer which is copolymerizable with said unsaturated polyester;
(c) an esterified polyurethane low profile additive which comprises the reaction product of
  (i) a polyisocyanate;
  (ii) a polyol or polyol blend having an average functionality of 2 to 3 hydroxyl groups per molecule and a number average molecular weight of at least 500; and
  (iii) a diol chain extender having between 2 and 32 carbon atoms per molecule;

to form a hydroxyl-terminated prepolymer which is further reacted with an anhydride in the presence of a catalyst comprising a diamine having no active hydrogens to esterify the hydroxyl-terminated prepolymer and form said esterified polyurethane low profile additive; and (d) a pigment;

(2) forming the resulting mixture into a desired shape; and (3) curing the formed mixture.

2. The method of claim 1 wherein the amine is triethylene diamine.

3. The method of claim 1 wherein the anhydride is a dicarboxylic acid anhydride.

4. The method of claim 1 wherein said further reaction is conducted in the presence of from about 150 to 2500 ppmw of the catalyst based on the total weight of the reaction product, the anhydride and the catalyst.

5. The method of claim 1 wherein said further reaction is conducted at an effective temperature to esterify the reaction product.

6. The method of claim 1 wherein said diol chain extender is selected from the group consisting of neopentyl glycol, butanediol isomers, hexanediol isomers, ethylene glycol, propylene glycol isomers, isomers of cyclohexane dimethanol, octanediol isomers, diethylene glycol, and dipropylene glycol.

7. A molded article made by the process of claim 1.

8. The method of claim 1 wherein the anhydride is selected from the group consisting of maleic anhydride, succinic anhydride, glutaric anhydride, citraconic anhydride, 2,3-dimethylmaleic anhydride, camphoric anhydride, cis-1,2-cyclohexane dicarboxylic anhydride, phthalic anhydride, homophthalic anhydride, trimellitic anhydride or mixtures thereof.

9. The method of claim 1 wherein the diamine has a molecular weight of from about 50 to 150 grams per gram mole.

* * * * *